United States Patent [19] [11] 4,421,803
Czeiler et al. [45] Dec. 20, 1983

[54] GLASS ENVELOPE FOR ELECTRIC LIGHT SOURCES

[75] Inventors: András Czeiler; István Kállai; László Simenfalvi, all of Budapest, Hungary

[73] Assignee: Egyesült Izzolampa es Villamossagi Rt., Budapest, Hungary

[21] Appl. No.: 102,360

[22] Filed: Dec. 11, 1979

[30] Foreign Application Priority Data

Dec. 12, 1978 [HU] Hungary .............................. EE 2610

[51] Int. Cl.³ .......................... B32B 1/02; B32B 3/14
[52] U.S. Cl. ....................................... 428/35; 427/28; 427/106
[58] Field of Search ................ 427/28, 106; 428/35

[56] References Cited

U.S. PATENT DOCUMENTS 3,320,460 5/1967 Bouchard et al. ................ 427/28 X

FOREIGN PATENT DOCUMENTS 581526 11/1977 U.S.S.R. .............................. 427/28

Primary Examiner—James R. Hoffman

[57] ABSTRACT

An improved glass envelope for electric light sources is described comprising an outer glass body and a thin glass matrix solidly attached to the glass body and comprising pigment grains fully embedded in the glass matrix. A precursor solution is formed from an organic solvent and a metalorganic and/or inorganic composition suitable for forming a glass having a softening point lower than that of the glass body. The surfaces of pigment grains are coated with the precursor solution and the solvent is evaporated from the pigment grains for obtaining pigment grains covered with a glass layer. The surface of the glass body is covered with the coated pigment grains and then baked at a temperature below the softening point of the glass body.

The resulting glass envelopes have decreased light absorption and provide for higher light efficiency and extend life times of the electric light sources.

7 Claims, No Drawings

GLASS ENVELOPE FOR ELECTRIC LIGHT SOURCES

BACKGROUND OF THE INVENTION

1. Field of the Invention

The present invention relates to a process for obtaining improved glass envelopes for electric light sources and to the glass envelopes obtained by the process.

2. Description of the Prior Art

The inner surfaces of bulbs for electric light sources such as incandescent lamps, high and low pressure mercury lamps etc. are in many cases covered with light refracting, coloring or luminescent powders, with transparent enamels or with heat reflecting layers depending on the desired properties. Numerous processes are known for preparing such coatings. The wet process is the most widely used.

There has been a desire to substitute the wet process by a so-called dry process, since such dry processes provide numerous advantages when compared with the wet process.

A major advantage of the dry process is to be seen in providing coatings free from binders requiring removal after coating. Among the most important dry processes are the electrostatic processes. Numerous workers have tried to find a suitable electrostatic process and several processes have been developed.

S. A. Lopenski et al in U.S. Pat. No. 2,811,131 issued Oct. 29, 1957 discloses a process for depositing electrostatically a fine silica layer (aerosil) on the inner walls of lamp bulbs. This process has the disadvantage of providing inadequate adhesion of the deposited layer and requires improvement of the adhesion of this layer on the inner surface of the bulb by an after-treatment consisting of an evaporation process followed by a heat-treatment.

West-German Pat. (DE-AS) No. 1,064,698 discloses a process for depositing electrostatically silica powder containing titanium dioxide on the inner wall of a light bulb. This process improves the optical parameters of the bulbs compared to those obtained by earlier processes employing pure silica, but it does not solve the fundamental problem.

West-German Pat. (DE-PS) No. 1,078,688 discloses an electrostatic process for coating of glass envelopes such as employed in incandescent lamps. This process is suitable for depositing silica in finely-divided form, however, the problem of providing an adhering coating could only be solved by applying a heat treatment at high temperature.

British Patent Specification No. 827,013 discloses another process for increasing the adhesion of the deposited silica powder. The patent provides for an addition of for example 0.5% $TiO_2$ of high density, but the mechanism of this process remains unexplained.

As can be recognized from the above references there has been a considerable effort in the past to improve the preparation of electrostatic coatings. All conventional processes had the drawback of leaving unresolved the problem of adhesion of the deposited pigments. The adhesion could only be obtained by employing for example an after-treatment at elevated temperature resulting in degradation of the optical parameters of the coating and thereby limiting severely the applicability of such process.

SUMMARY OF THE INVENTION

1. Purposes of the Invention

It is an object of the present invention to provide a process for coating of glass envelopes, which advantageously employs the electrostatic coating process.

It is another object of the present invention to provide for an improved adhesion of the deposited pigments to the glass envelope.

It is a further object of the present invention to provide for improved optical parameters of the coatings of glass envelopes for electric lights and in particular to provide for improved optical transmission of the coating.

These and other objects and advantages of the present invention will become evident from the description which follows.

2. Brief Description of the Invention

The present invention provides a lamp glass envelope for electric light sources comprising an outer glass body, a thin glass matrix solidly attached to the glass body and comprising pigment grains fully embedded in the glass matrix. The glass matrix is preferably obtained from a glass forming precursor. Preferably the pigment grains have diameters from about 0.1 to 5 microns. The softening point of the glass matrix is preferably lower than the softening point of the glass body and lower than the softening point of the pigment. More preferred are glass matrices having a softening point at least about 80° C. lower than the softening point of the glass body. Preferably, the glass matrix comprises a low-alkali silicon dioxide glass. The glass matrix can further comprise a member of the group consisting of lead, zinc, zirconium, aluminum and titanium. A preferred pigment is titanium dioxide.

Also, a process is provided for coating glass bodies of electrical light sources. A precursor solution is formed which comprises an organic solvent, a metal-organic and/or inorganic composition providing a precursor compound for a glass having a softening point lower than that of the glass body. The surfaces of pigment grains are coated with the precursor solution. Then the surface of the glass body is covered with said pigment grains coated with the glass layer and the glass body covered with the pigment grains is baked at a temperature below the softening point of the glass body.

Preferably the solvent from the solution is evaporated from the pigment grains for obtaining pigment grains covered with a glass layer.

Preferably a homogeneous suspension is prepared from the precursor solution and the pigment grains. Preferably the precursor compound for coating the pigment grain is a metal-organic compound prepared from a solution containing silicic acid esters, boric acid esters, phosphoric acid esters or mixtures thereof.

Preferably the organic solvent is a mixture of ketone and alcohol having a boiling point below about 200° C. The precursor solution can comprise a member of the group consisting of alkaline earth metal nitrates, lead acetate, zinc acetate, zirconium nitrate, aluminum nitrate, titanium nitrate and mixtures thereof.

An advantage of the present invention is the higher light efficiency of the electrical lighting devices, the decreased light absorption of the coating and the increased lifetime of the electrical lights. The simplicity and low cost of the process results in numerous economic advantages.

The invention accordingly consists in the combination of elements and series of steps which will be exemplified in the process and article of manufacture hereinafter described and of which the scope of application will be indicated in the appended claims.

DETAILED DESCRIPTION OF THE INVENTION AND PREFERRED EMBODIMENTS

According to the present invention, the pigment grains to be deposited are pretreated. This pretreatment results in a thin adhesion layer on the surface of the grains, which insures adhesion but which does not increase light absorption and which facilitates the electrostatic coating and the pre-coating fluidization.

The process of West-German Pat. (DE-AS) No. 2,015,072 has drawbacks when it is employed for depositing of layers on the interior of electric light bulbs. According to this patent specification, the enamel frit surface is coated with an alkyl silane or an aryl silane.

According to J. D. Snow in U.S. Pat. No. 3,928,668 issued Dec. 23, 1975, the glass powder employed for the production of the porcelain glaze is coated with thermo-polymerizable organic polysiloxanes. However, these coatings achieve only an increase in the specific resistance of the grains to such an extent as to provide for realization of electrostatic deposition. The electrostatically deposited pigment is subsequently completely fused for forming an enamel or a glaze, respectively. In this case no coating of the grains is required which would have a lower melting point compared with the grains and the substrate and the grains could sinter together among themselves or with the substrate.

It is an important aspect of the present invention that the pigments employed for depositing on glass envelopes of electric lights are pretreated with solutions containing metal-organic compounds and these solutions contain the glass-forming compounds in part as organic compounds. A pigment pretreated with such a solution has its surface covered with a predetermined glass-forming precursor. This precursor is later on transformed by heat-treatment to a glass of predetermined composition.

According to the present invention the softening point of the glass has to be lower compared with the softening point of the glass body forming the substrate and with the softening point or melting point, respectively, of the pigment. Preferably the softening point of the glass forming the matrix for the pigment grains is at least about 80° C. lower than the softening point of the glass body. In addition other physical and chemical conditions have to be met by the glass matrix.

Glass precursor gels formed of organo-metallic compounds are already known. For example, a reference is provided by B. E. Yoldas: "Preparation of glasses and ceramics from metal-organic compounds" in the Journal of Materials Science, 12(1977) pages 1203–1208. Similarly, Masayuki Yamane, Shinji Aso and Teruo Sakaino have published "Preparation of a gel from metal alkoxide and its properties as a precursor of oxide glass" in the same journal, Journal of Materials Science, Volume 12 (1978) pages 865–870. Additional references for the application of gel precursors are in the references and also U.S. Pat. No. 3,927,224 discloses also the application of glass forming precursors in the gel phase.

According to the present invention solutions are formed containing metalorganic compounds. Preferably the solvent is an alcohol, ether, ketone or mixtures thereof having a boiling point below about 200° C. Preferred solvents are mixtures of ethylalcohol and acetone. The solutions contain preferably metal-organic compounds and metal salts of organic acids. The preferred metals are those providing a glass of desired transparency and a suitable melting point for the resulting glass matrix. Such metals include the alkali metals, the alkaline earth metals, the earth metals and lead, zinc, zirconium, titanium and the like. The organic part of the metal organic compound can be for example an alkyl group, an alkoxy group, an alkanoyl group, and the like. Glass forming acids are phosphoric acid, silica and boric acid. They can be added to the solutions in their hydroxy form or as salts of the above-mentioned metals or as bound to organic groups such as acids, alcohols or hydrocarbyl groups. Examples include tetraethyl silicate, silica and phosphoric acid esters. The solution can also contain a small amount of an inorganic compound, for example potassium hydroxide. Also the metals can be introduced as salts of soluble inorganic acids such as nitrates.

The concentration of the glass-forming precursors in the solution is preferably about 6 to 14 percent by weight. The pigment to be prepared is suspended in the above solution. The suspension is obtained by employing conventional means such as a rotating mill. The solvent is evaporated from the pigment. Preferably the evaporation takes place at atmospheric pressure and at temperatures provided by a water bath. The remaining powder is then dried. A preferred drying temperature is from about 120° C. to 200° C. The upper temperature limit for the drying process is the temperature causing beginning decomposition of the organic precursor compounds. The surface of the pigment prepared in this fashion contains mainly the components of the glass required for the pigment grain coating as an organic precursor compound without a gel phase being present. Later heat-treatments transform these precursor compound into a glass and provide a coating which exhibits excellent adhesion to the pigment grains and to the glass body of the electrical lamp.

Pigments pretreated according to the present invention possess properties which are suitable for preferably electrostatic coating followed by heat-treatment. The pigment grains adhere to each other and to the glass surface via the coating and are resistant both to mechanical stresses during the production of lamps and to exacting conditions of use.

The present invention provides the adaptation of the composition of the glass coating to the pigments best suited to the requirements. The softening point of the coating, the light absorption of the coating, the specific resistance and other parameters can be selected according to the purposes of the application. This resolves problems of the electrostatic process including insufficient adhesion of the deposited color pigment, poor resistance to mechanical shocks or to the effect of knocks resulting in loosening or crumbling of the coating during flushing with gas in an exhaust machine.

The present invention is not limited to electrostatic processes. The pigments pretreated in accordance with the present invention may freely be applied to the conventional coatings of lamps, since the excellent adhesion properties of the coatings improve the quality of the lamps.

The pretreated titanium dioxide such as exemplified in Example 1, below, is as produced very suitable for the conventional liquid suspension process. The same is true for high and low pressure mercury vapor lamps.

The thicknesses, for example normally a thickness of from about 5 microns to 15 microns is preferred, for colored coatings thicknesses of 60 microns to 80 microns and for mercury vapor lamps thicknesses from 30 microns to 60 microns can be employed.

EXAMPLE 1

A process for internally coating a standard (GLS) incandescent lamp with light dispersing pigments

Solution A 22.5 g. p.a. boric acid was dissolved in 450 ml 96% ethyl alcohol. After completion of the dissolution 150 ml. tetra-ethyl silicate and thereafter 100 ml. acetone were mixed to the solution. The solution prepared in this way was allowed to stand for one hour.

Solution B

To 144 ml. tetra-ethyl silicate, 6 ml alcohol containing 5% KOH solution and 150 ml acetone were added. This solution was then left to stand for one hour.

The solutions A and B were mixed together and the result was a light yellow, transparent solution in which no gel precipitation could be observed. To the solution prepared in this way 1050 g titanium dioxide (e.g. Bayer "Titan A") was mixed and by energetic shaking, a homogeneously dispersed suspension was obtained.

The homogenized material was poured into a porcelain dish. Then it was distilled over a water bath to dryness and then dried in a drying oven at a temperature of 120° C., i.e. to obtain a complete evaporation of the solvent. This was followed by a heat-treatment at a temperature of 200° C. for one hour.

The dried material was then dry-ground in a ball mill by porcelain balls for 24 hours and then the material was sieved through a sieve with a mesh diameter or size of 60 $\mu$m.

The substance pretreated in this way was found to be suitable for the electrostatic coating of the inner walls of bulbs of incandescent lamps and has the favorable adhesion properties described above.

EXAMPLE 2

Process for coating decorative lamps with pigments

The process was carried out similarly to that described in Example 1, but with the difference that instead of 6 ml, 18 ml alcohol-containing 5% KOH solution was added to solution B. According to the color required—similarly to Example 1—the coating of the pigment was carried out, but with the difference that for yellow lamps a cadmium yellow 1040-V.Marquardt pigment, for red lamps cadmium-red BS/V, Bayer pigment, for green lamps light-green 5G Bayer pigment and for blue lamps, ultramarine-blue 5, Siegle pigment was used.

For the purpose of coating lamps with other colors, other commercially obtainable pigments can be used. In all other respects, the procedure described in Example 1 is to be followed.

EXAMPLE 3

Pretreatment process for color-corrected fluorescent powders for high-pressure mercury vapor lamps

Solution A

To 220 ml tetra-ethyl silicate a 10 ml alcohol-containing, 5% KOH solution and 150 ml acetone were added. Thereafter, an 8% calcium nitrate solution containing 50 ml acetone was dispensed in small portions and under constant stirring.

Solution B 17.5 g boric acid was dissolved in 350 ml alcohol. After completion of the dissolution, 220 ml acetone was added.

The solutions A and B were mixed together, whereby a yellow water-clear (transparent) solution was obtained, with the aid of which the pretreatment of the fluorescent powder was carried out as follows:

1050 g yttrium-phosphate-vanadate was added to the fluorescent powder and this solution was then homogenized by energetic shaking.

Thereafter the procedure was continued according to Example 1 but with the difference that the milling time was only 4 hours.

EXAMPLE 4

Surface treatment of halophosphate fluorescent powders for coating the interior of low-pressure mercury vapor lamps (fluorescent tubes)

To 200 ml 8% calcium nitrate solution containing 200 ml alcohol, 150 ml acetone and thereafter 200 ml tetra-ethyl silicate were added. This solution was then left to stand for one hour. Thereafter 10 ml 5% KOH solution containing alcohol and 100 ml 7% diethyl-hydrogen-orthophosphoric acid containing ethyl alcohol were added.

The yellow solution obtained this way was found to be suitable for the surface treatment of halophosphate fluorescent powders.

The subsequent steps of the process were as described in Example 3, the only deviation being that the coated pigment was, in this particular case, a calcium halophosphate fluorescent powder.

EXAMPLE 5

Pretreatment process for colored PAR 38 (parabolic reflector) and similar types of lamps

Solution A 15 g $PbB_2O_4$ was dissolved with the aid of 100 ml 98% ethyl alcohol in 30 ml. 99.5% acetic acid, under heating. After completion of the dissolution, a 5% solution of $H_3BO_3$ containing ethyl alcohol and a 4% solution of $Al(NO_3)_3$ containing ethyl alcohol were added.

Solution B

To 380 ml tetra-ethyl silicate 20 ml of 10% solution KOH containing ethyl alcohol and 180 ml acetone were added.

The solutions A and B were mixed together, whereby a yellow water-clear (transparent) solution was obtained. In 830 ml of the solution 150 g colored transparent enamel powder was suspended. This suspension was sprayed on the glass surface in a layer thickness corresponding to the required depth of color. This coating was heat-treated at a temperature of 580° C. whereby a colored transparent coating was obtained.

EXAMPLE 6

Heat-reflecting Coating

In 1000 ml glass precursor solution (mixture of solutions A and B mentioned in Example 1) $ZrO_2$ stabilized with 1000 g $Ca(NO_3)_2$, was brought into suspension and this suspension was diluted with acetone to 2500 ml.

The suspension prepared in this way was deposited on the external surface of a discharge vessel by a spray gun in the usual way. This was followed by a heat treatment at a temperature of 460° C.

It thus will be seen that there is provided a process and an article of manufacture which achieves the various objects of the invention and which is well adapted to meet the conditions of practical use.

As various possible embodiments might be made of the above invention, and as various changes might be made in the embodiment above set forth, it is to be understood that all matter herein described is to be interpreted as illustrative and not in a limiting sense.

What is claimed is:

1. A glass envelope for electric light sources comprising:
    an outer glass body;
    a glass matrix adhering to the inner surface of the glass body and comprising pigment grains fully embedded into the glass matrix, said glass matrix being a cured glass forming precursor.
2. The glass envelope as set forth in claim 1, wherein the pigment grains have a diameter of from about 0.1 to 5 microns.
3. The glass envelope as set forth in claim 1, wherein the softening point of the glass matrix is lower than the softening point of the outer glass body and lower than the softening point or melting point, respectively, of the pigment.
4. The glass envelope as set forth in claim 3, wherein the softening point of the glass matrix is at least about 80° C. lower than the softening point of the glass body.
5. The glass envelope as set forth in claim 1, wherein the glass matrix comprises a low alkali silicondioxide glass.
6. The glass envelope as set forth in claim 1, wherein the glass matrix comprises a member of the group of oxides consisting of oxides of lead, zinc, zirconium, aluminum and titanium.
7. The glass envelope as set forth in claim 1, wherein the pigment is titanium dioxide.

* * * * *